US 11,173,657 B2

(12) United States Patent
Hagedorn et al.

(10) Patent No.: US 11,173,657 B2
(45) Date of Patent: Nov. 16, 2021

(54) POWDER APPLICATION UNIT FOR A PBLS SYSTEM AND METHOD FOR APPLYING TWO SUCCESSIVE POWDER LAYERS IN A PLBS METHOD

(71) Applicant: Aconity GmbH, Herzogenrath (DE)

(72) Inventors: Yves Hagedorn, Aachen (DE); Andreas Görres, Aachen (DE)

(73) Assignee: Aconity GmbH, Herzogenrath (DE)

( * ) Notice: Subject to any disclaimer, the term of this patent is extended or adjusted under 35 U.S.C. 154(b) by 879 days.

(21) Appl. No.: 15/737,986

(22) PCT Filed: Jun. 15, 2016

(86) PCT No.: PCT/EP2016/063769
§ 371 (c)(1),
(2) Date: Dec. 19, 2017

(87) PCT Pub. No.: WO2016/202867
PCT Pub. Date: Dec. 22, 2016

(65) Prior Publication Data
US 2018/0297275 A1 Oct. 18, 2018

(30) Foreign Application Priority Data

Jun. 19, 2015 (DE) .......................... 102015109841.5

(51) Int. Cl.
*B29C 64/153* (2017.01)
*B33Y 10/00* (2015.01)
(Continued)

(52) U.S. Cl.
CPC ............ *B29C 64/153* (2017.08); *B22F 10/20* (2021.01); *B29C 64/205* (2017.08);
(Continued)

(58) Field of Classification Search
CPC ... B29C 64/153; B29C 64/205; B29C 64/371; B29C 64/214; B29C 64/268;
(Continued)

(56) References Cited

U.S. PATENT DOCUMENTS

| 4,418,845 A | 12/1983 | Hehl |
| 4,818,562 A | 4/1989 | Arcella et al. |

(Continued)

FOREIGN PATENT DOCUMENTS

| DE | 19649865 C1 | 2/1998 |
| DE | 19952998 A1 | 5/2001 |

(Continued)

OTHER PUBLICATIONS

International Search Report and Written Opinion of the International Searching Authority from corresponding Patent Cooperation Treaty (PCT) Application No. PCT/EP2016/063769, indicated completed on Sep. 8, 2016.

(Continued)

*Primary Examiner* — Francisco W Tschen
*Assistant Examiner* — Guy F Mongelli
(74) *Attorney, Agent, or Firm* — Gardner, Linn, Burkhart & Ondersma LLP

(57) ABSTRACT

The invention relates to a powder application unit (8) for a PBLS system (1), wherein the powder application unit (8) comprises an application medium which is movably mounted parallel to a working plane of the PBLS system (1) in order to be able to move powder along the working plane, wherein a distance of the application medium to the working plane can be modified in that the application medium is mounted about a swivel axis (S) in a swiveling manner in order to be able to swivel the application medium away from the working plane. In order to provide an improved powder application unit, according to the invention the powder (Continued)

application unit (8) has a means for swiveling the application medium which is designed and which interacts with the application medium such that the application medium is first unswiveled in a work position during outward travel and then, during the continued travel along a predetermined route, is swiveled against the work position and, during an opposite return travel along the predetermined route, is unswiveled in the work position. The invention further relates to a method for applying two successive powder layers in a PBLS method.

18 Claims, 7 Drawing Sheets

(51) Int. Cl.
| | |
|---|---|
| B33Y 30/00 | (2015.01) |
| B29C 64/214 | (2017.01) |
| B29C 64/205 | (2017.01) |
| B29C 64/371 | (2017.01) |
| B22F 10/20 | (2021.01) |
| B29C 64/268 | (2017.01) |

(52) U.S. Cl.
CPC .......... *B29C 64/214* (2017.08); *B29C 64/268* (2017.08); *B29C 64/371* (2017.08); *B33Y 10/00* (2014.12); *B33Y 30/00* (2014.12); *B29K 2995/0073* (2013.01)

(58) Field of Classification Search
CPC ....... B33Y 10/00; B33Y 30/00; B22F 3/1055; B22F 2003/1059; B29K 2995/0073
See application file for complete search history.

(56) References Cited

U.S. PATENT DOCUMENTS

| | | | |
|---|---|---|---|
| 5,252,264 A | 10/1993 | Forderhase et al. | |
| 6,764,636 B1 | 7/2004 | Allanic et al. | |
| 7,625,413 B1* | 12/2009 | Reed, Jr. ............. | C22B 21/0069 23/313 R |
| 7,931,462 B2 | 4/2011 | Mattes | |
| D835,162 S | 12/2018 | Reches et al. | |
| 2002/0060137 A1* | 5/2002 | Byeong-Ho .......... | B66F 7/0691 198/750.1 |
| 2004/0084814 A1 | 5/2004 | Boyd et al. | |
| 2005/0263932 A1 | 12/2005 | Heugel | |
| 2006/0076700 A1* | 4/2006 | Phillips .................. | A43B 17/00 264/40.1 |
| 2006/0105102 A1* | 5/2006 | Hochsmann ............ | B29C 41/36 427/180 |
| 2007/0074659 A1 | 4/2007 | Wahlstrom | |
| 2008/0203621 A1* | 8/2008 | Mattes .................. | B29C 64/153 264/497 |
| 2012/0164322 A1 | 6/2012 | Teulet | |
| 2012/0323345 A1* | 12/2012 | Jonas .................. | G01B 21/045 700/57 |
| 2013/0177766 A1* | 7/2013 | Grebe .................. | B29C 64/182 428/411.1 |
| 2014/0084517 A1 | 3/2014 | Sperry et al. | |
| 2014/0329953 A1 | 11/2014 | Paternoster | |
| 2015/0139849 A1 | 5/2015 | Pialot, Jr. et al. | |
| 2016/0185040 A1 | 6/2016 | Costlow | |
| 2016/0193695 A1* | 7/2016 | Haynes ................. | B22F 3/1055 219/76.12 |
| 2018/0194126 A1 | 7/2018 | Hagedorn et al. | |
| 2018/0297283 A1 | 10/2018 | Hagedorn et al. | |

FOREIGN PATENT DOCUMENTS

| | | |
|---|---|---|
| DE | 10342883 A1 | 5/2005 |
| DE | 112004000301 T5 | 1/2006 |
| DE | 102004041633 A1 | 3/2006 |
| DE | 202009010489 U1 | 10/2009 |
| DE | 102009029765 A1 | 12/2010 |
| DE | 202009016400 U1 | 4/2011 |
| DE | 202011003443 U1 | 12/2011 |
| DE | 202012007238 U1 | 8/2012 |
| EP | 1316408 A1 | 6/2003 |
| EP | 2399695 A1 | 12/2011 |
| EP | 2732889 A2 | 5/2014 |
| GB | 2315699 A | 11/1998 |
| WO | 2019031979 A1 | 2/2019 |

OTHER PUBLICATIONS

International Preliminary Examination Report from corresponding Patent Cooperation Treaty (PCT) Application No. PCT/EP2016/063769, dated Jun. 2, 2017.

Preliminary Report on Patentability of the International Searching Authority in English from corresponding Patent Cooperation Treaty (PCT) Application No. PCT/EP2016/063769, completed Nov. 2, 2017.

* cited by examiner

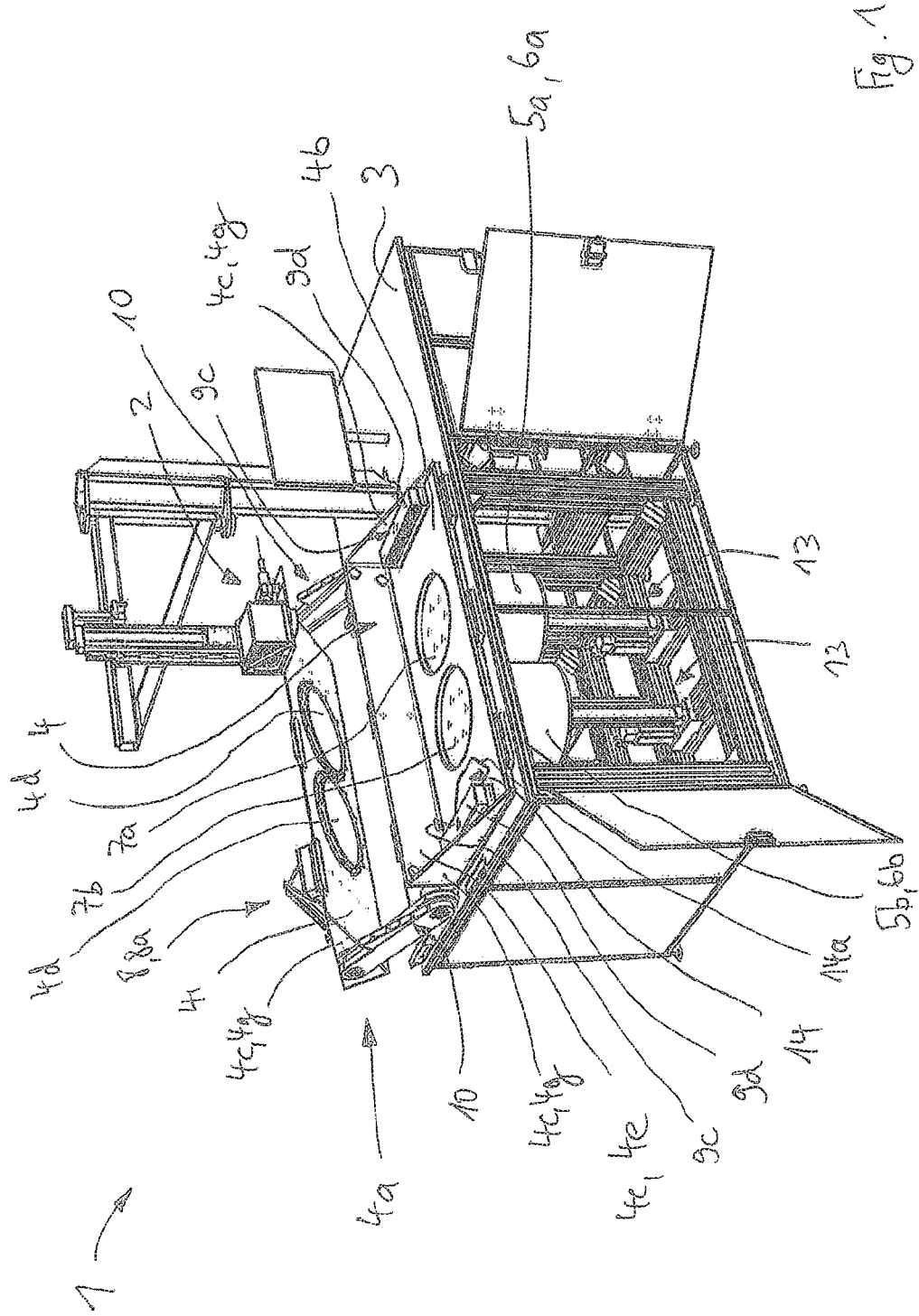

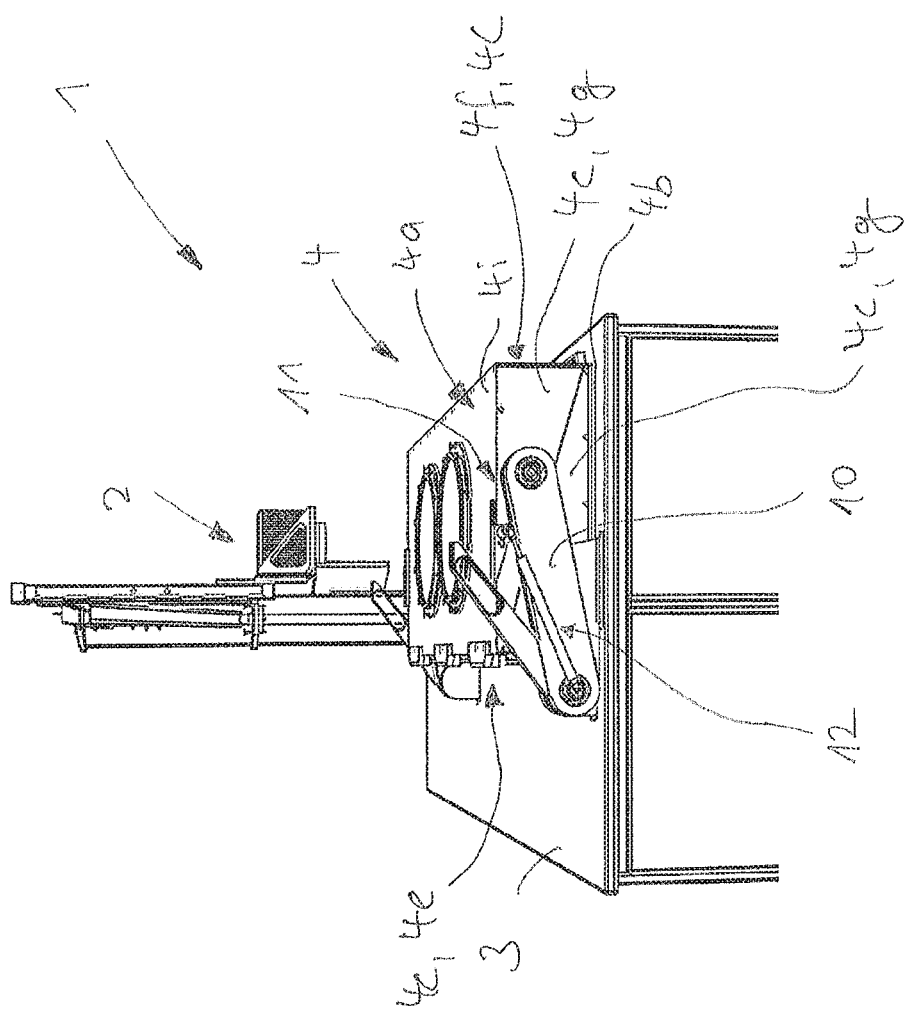

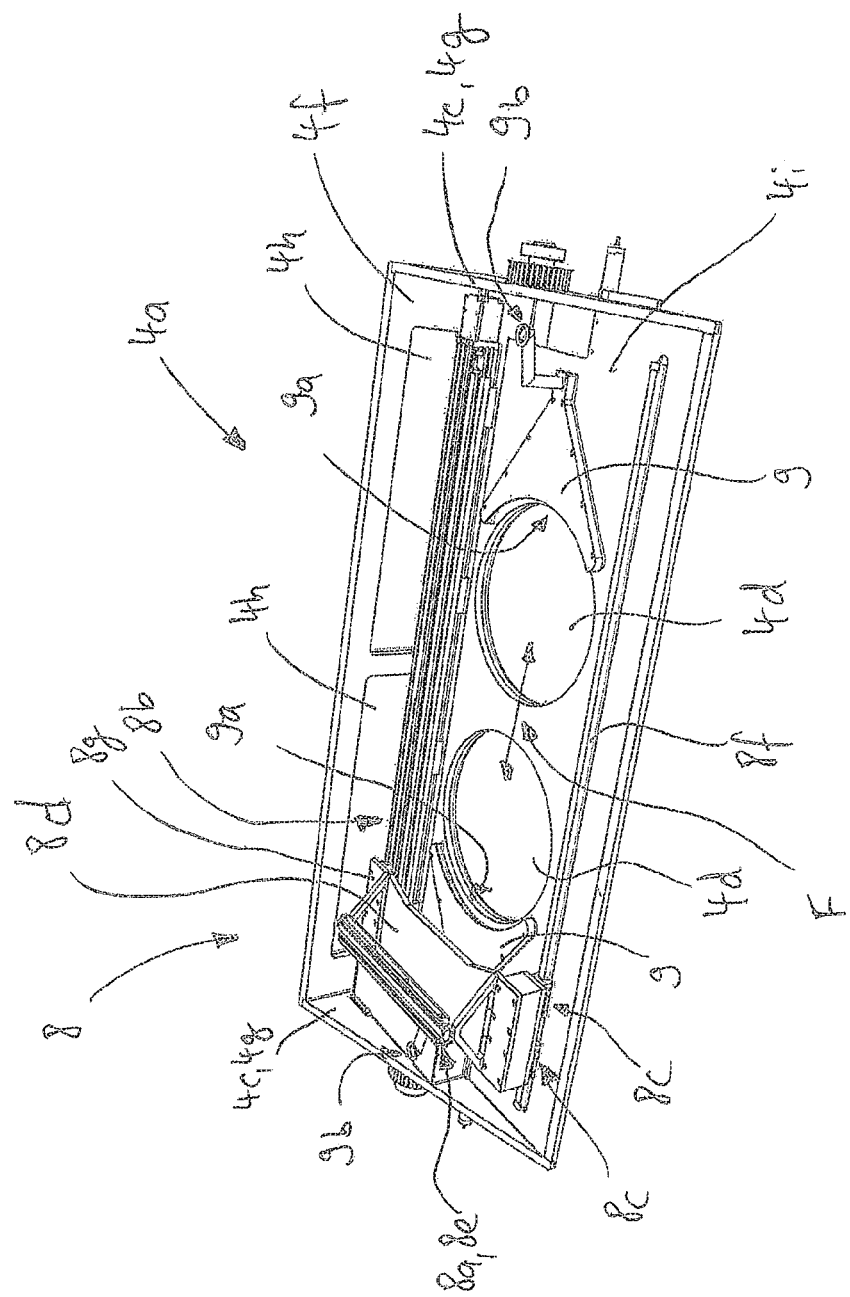

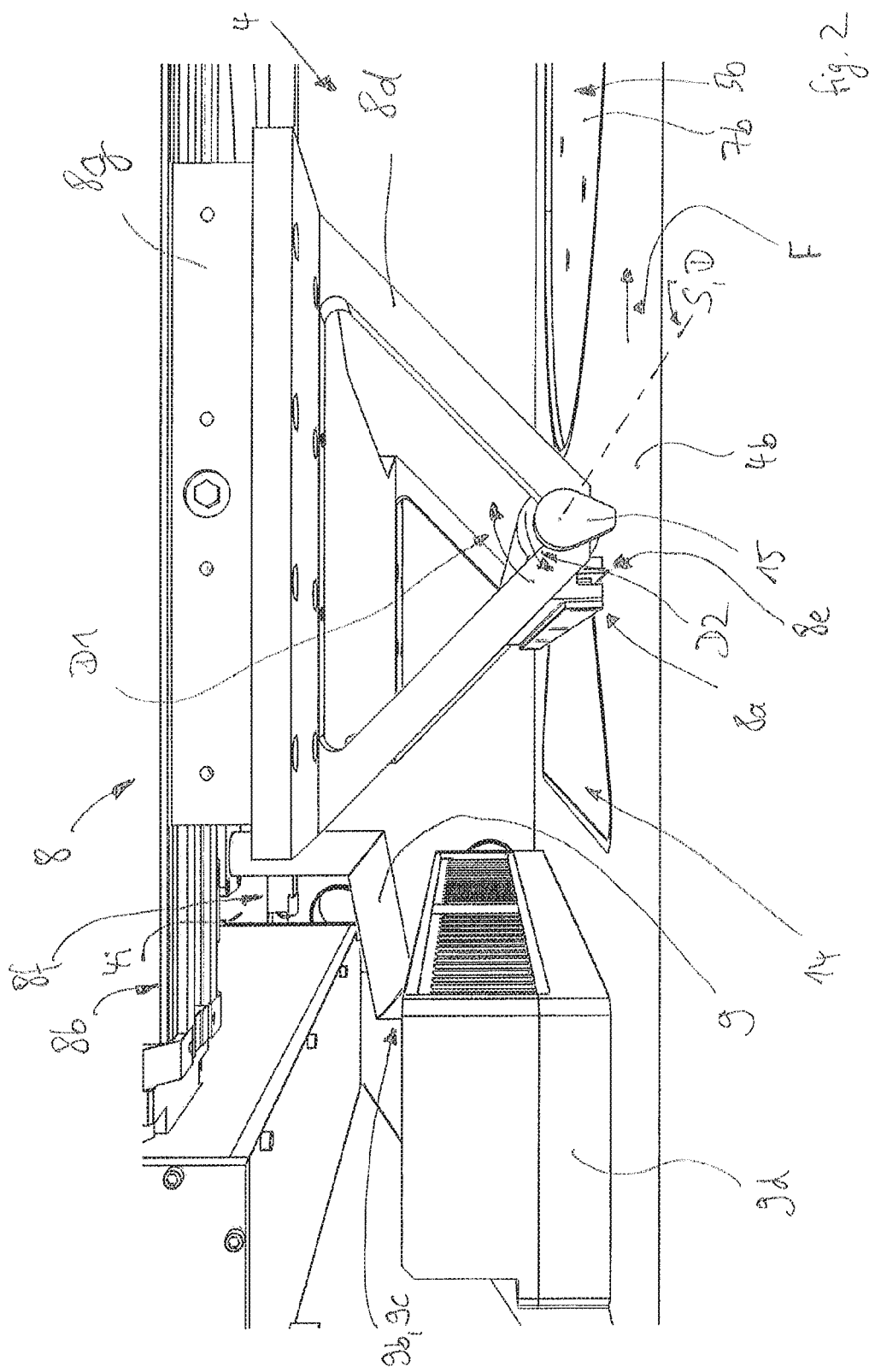

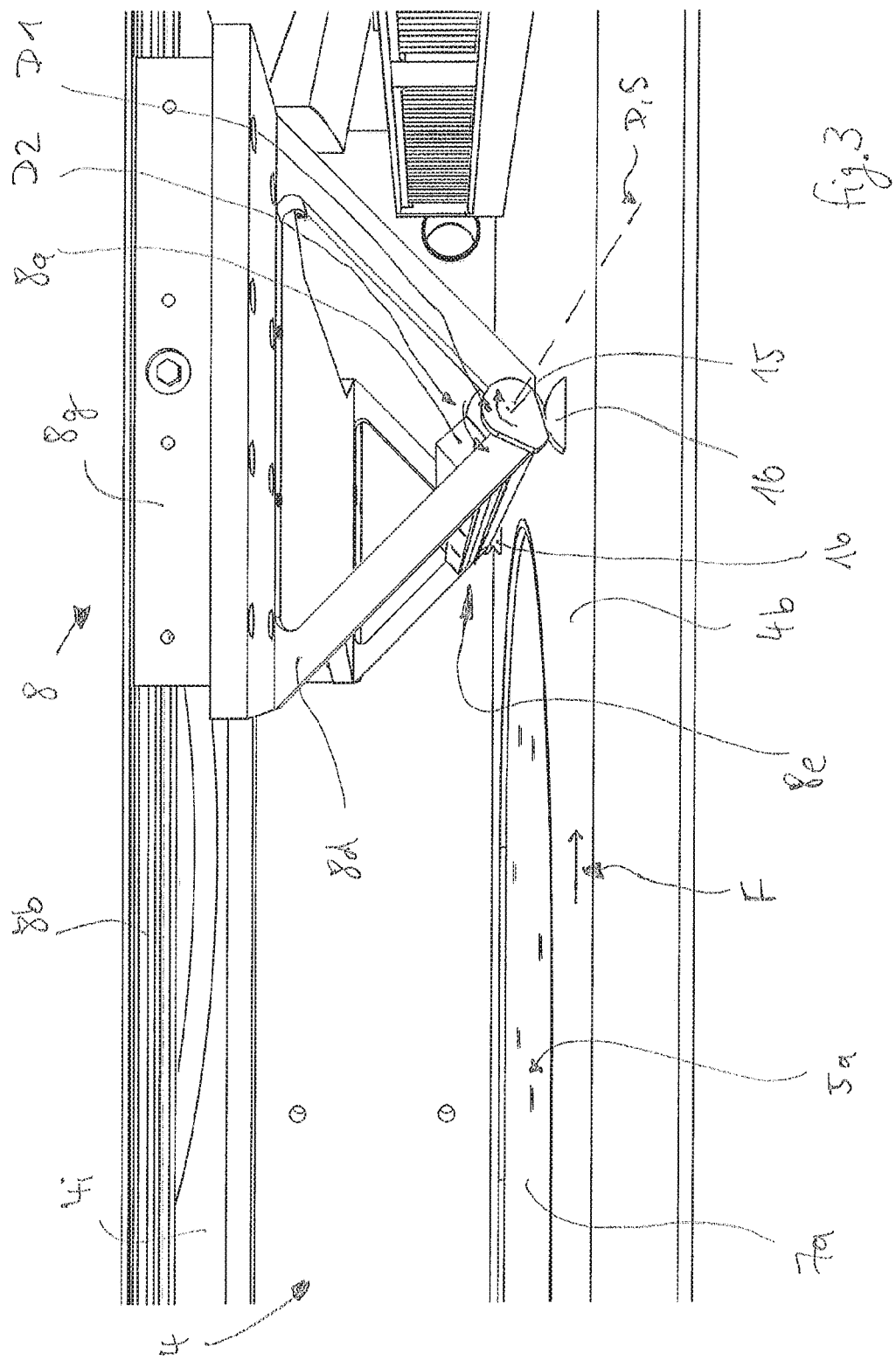

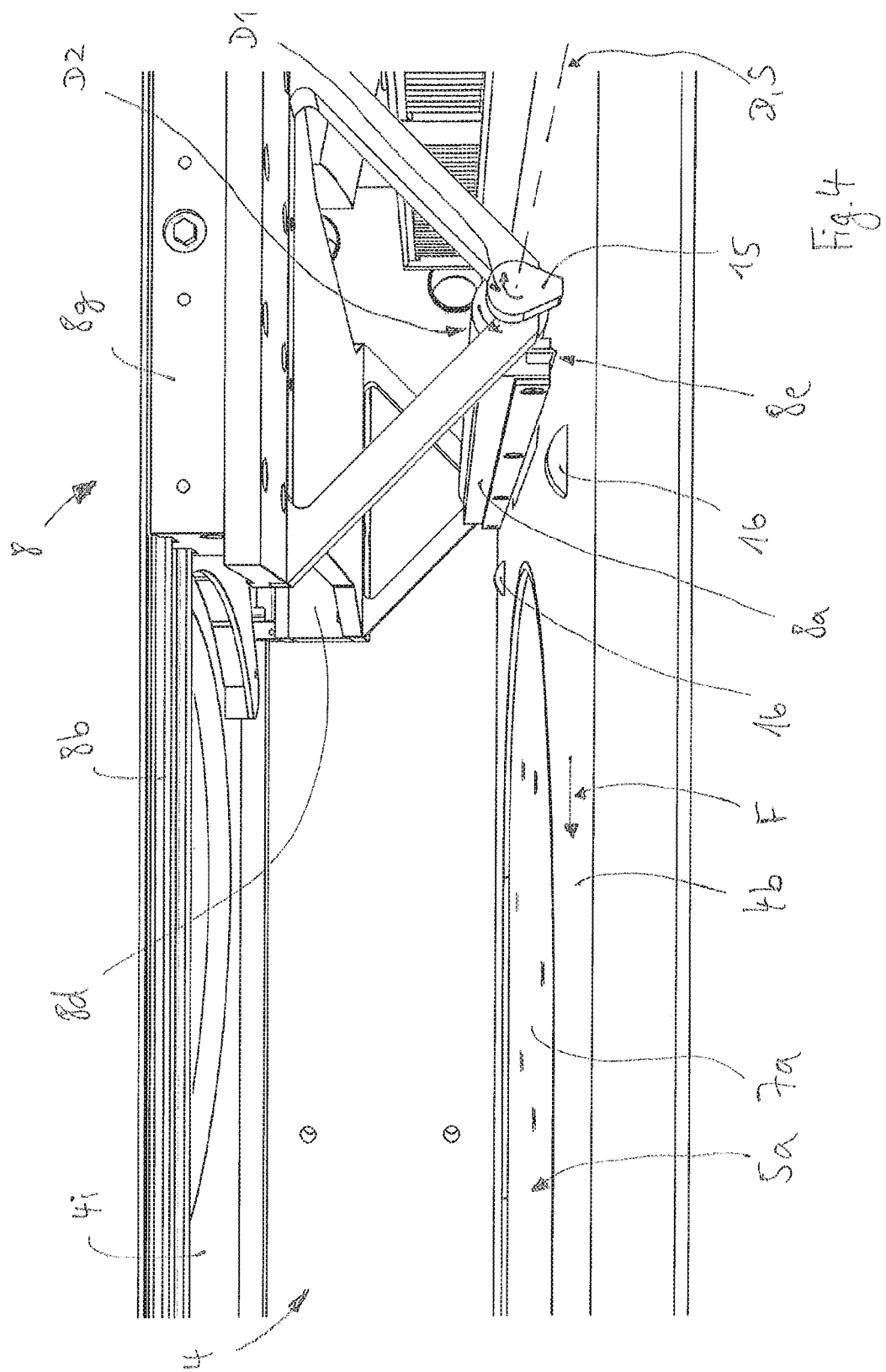

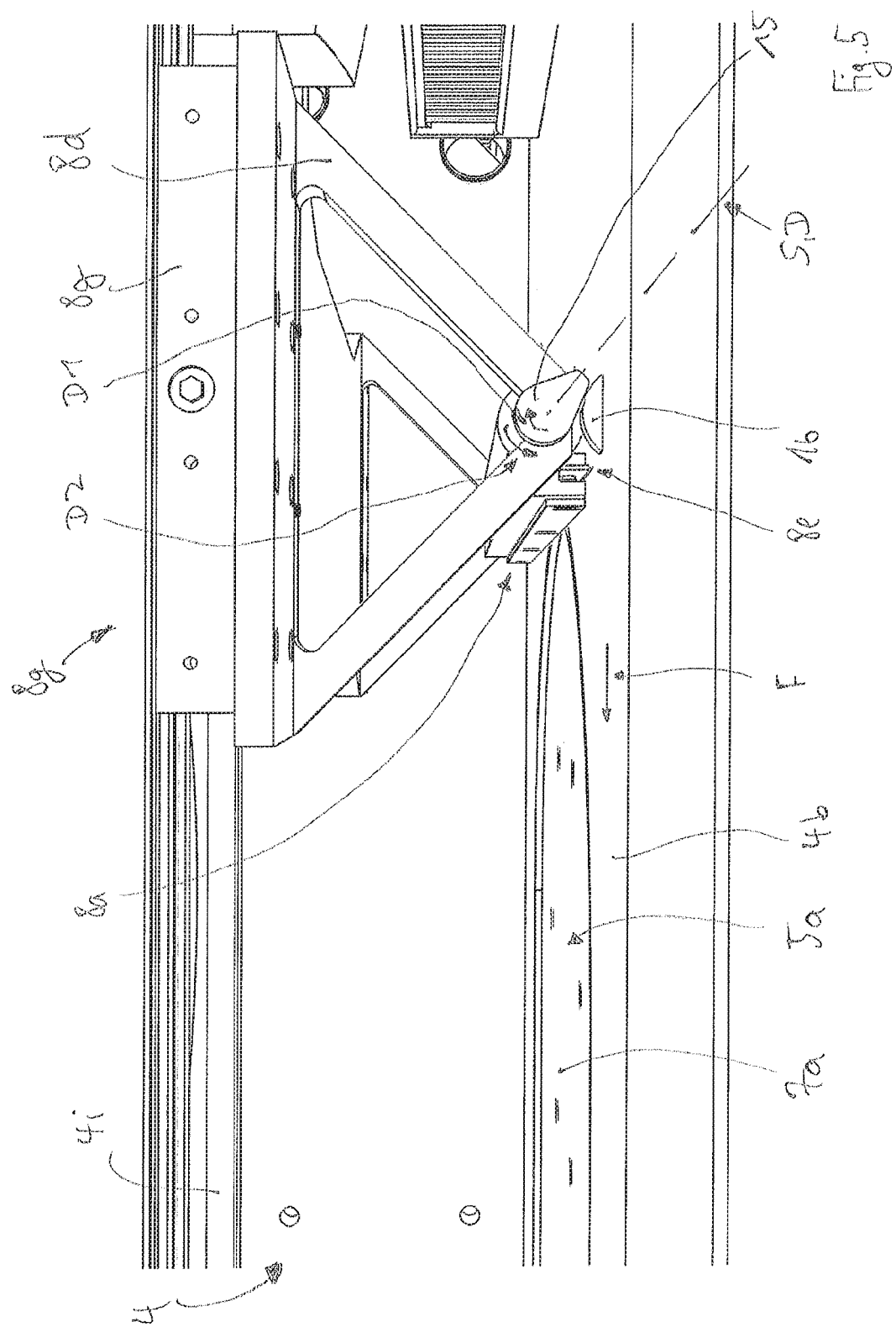

POWDER APPLICATION UNIT FOR A PBLS SYSTEM AND METHOD FOR APPLYING TWO SUCCESSIVE POWDER LAYERS IN A PLBS METHOD

CROSS REFERENCE TO RELATED APPLICATIONS

The present application claims the priority benefits of International Patent Application No. PCT/EP2016/063769, filed Jun. 15, 2016, and claims benefit of German Application DE 10 2015 109 841.5 filed Jun. 19, 2015 which are incorporated herein by reference.

BACKGROUND OF THE INVENTION

The invention relates to a powder application unit for a PBLM system, wherein the powder application unit comprises an application medium which is mounted to be movable in parallel with a working plane of the PBLM system in order to be able to move powder along the working plane, wherein a distance of the application medium to the working plane can be changed in that the application medium is mounted to be pivotable about a pivot axis in order to be able to pivot the application medium away from the working.

Moreover, the invention relates to a method for applying two successive powder layers in a PBLM method.

Powder bed-based laser melting (PBLM), for which the term of selective laser fusion is also used, belongs to the group of generative manufacturing methods which are also referred to as additive manufacturing (AM) methods. PBLM is known e.g. from the German patent document DE 196 49 865 C1.

As a powder bed-based method, PBLM is to be distinguished in particular from selective laser sintering and from laser deposition welding. In the case of PBLM, components are produced in layers from a material which initially is in powder form, in particular in the form of synthetic materials or metals which—unlike in the case of laser deposition welding—is provided in layers as a resting powder bed and—unlike in the case of selective laser sintering—is completely melted and solidifies without the addition of binding agents.

In the case of the PBLM method which can be performed on a corresponding PBLM system, a movable application medium which can be designed e.g. as a brush can be used to apply a first thin powder layer of the material to be processed at a uniform layer thickness of typically 10 to 100 µm onto a substrate plate which is also defined as a base plate. The application medium is typically attached to a slide which is correspondingly movably mounted for moving the application medium as required. The substrate plate is supported by a support plate and is releasably attached, e.g. screwed, thereto. In this case, the support plate and thus also the substrate plate are arranged initially in a starting position in which the substrate plate with its surface is located below a horizontally extending working plane by the amount of the desired layer thickness. Typically, the support plate forms the movable floor of a reservoir (component reservoir) which, together with an upper opening opposite the floor, adjoins the working plane below the working plane. In this case, the floor is fitted in the manner of a piston inside the side wall of the reservoir extending at a right angle to the floor and is movable in order to be able to be lowered together with the substrate plate in steps in relation to the working plane. The application medium is movable above and in parallel with the working plane via the slide in order to push or apply the powder, starting from the working plane, onto the support plate or the substrate plate arranged thereon. When travelling over the reservoir, the application medium completely spans the opening of the reservoir in order to be able to generate, between the support plate and the working plane, a uniform powder layer with a surface which is as flat as possible.

Subsequently, the powder of the applied layer is selectively or locally completely melted by means of a laser beam, i.e. only in regions selected according to a 3D CAD model of the component to be manufactured. For this purpose, the 3D CAD model is divided by software into individual layers (slicing), from which strips are determined in the manner of contour lines of the component as selected regions, along which the laser beam is guided for selectively or locally melting the respective powder layer. The complete melting and subsequent solidification of the respective powder layer causes the material to be compacted in layers to form the component to be manufactured.

Starting from the starting position, the support plate, which accordingly serves as a construction platform, or the floor of the reservoir, after corresponding scanning of the selected regions of first powder layer, is lowered by the amount of a further desired layer thickness and a further powder layer is applied to the respectively previous layer, is melted and hereby compacted and joined to the previous layer. In this case, at least one of the previous layers is melted again at least partially in order to ensure an integrally joined connection to the following layer. This cycle is repeated with a plurality of powder layers until the component is completed. By means of the selective melting of selected regions in each powder layer, a powder bed which consists of non-fused powder of all applied layers and surrounds the component is also built up in the reservoir between the support plate and the working plane. In order to remove the component from the powder bed, the floor of the reservoir formed by the support plate is raised in the direction of the working plane and thus in the direction of an upper opening of the reservoir opposite the floor and the substrate plate, to which the component is integrally joined via the first layer, is released from the support plate and removed from the PBLM system. The component is subsequently separated, e.g. sawn off, from the substrate plate. In this manner, PBLM can be used to produce three-dimensional components in a mouldless manner, i.e. without tools or moulds, and almost without restrictions in relation to the geometric component complexity.

In order to provide the application medium of a PBLM system with the powder on the working plane, powder conveying mechanisms according to the bottom-up principle and according to the top-down principle are essentially known and are used to convey the powder to the working plane. In the case of a bottom-up mechanism, the powder is conveyed from below the working plane upwards onto the working plane and in the case of a top-down mechanism the powder is conveyed from above the working plane downwards onto the working plane.

For example, PBLM systems are known which have a bottom-up mechanism which comprises a reservoir (powder reservoir) which is designed similarly to the above-described reservoir for the component. Accordingly, this reservoir likewise comprises a floor which is movable in the manner of a piston. An upper opening in the reservoir opposite the floor is arranged in the working plane, from where the reservoir adjoins the working plane below the working plane. The powder stored in the reservoir of the bottom-up powder conveying mechanism is moved by raising the support plate, which forms the floor, inside the reservoir and, in association therewith, reducing the available volume of the reservoir in the direction of the upper opening or through the upper opening of the reservoir at that location and is thus conveyed to the working plane where it is provided to the application medium. By inversely lowering the floor, the available volume of the reservoir is increased in order to be able to receive and store a corresponding quantity of powder therein.

Unlike in the case of top-down mechanisms, the powder in a bottom-up mechanism does not fall in a gravity-driven manner into the region of the working plane. As a result, dust formation resulting in optical and movable components of the PBLM system becoming undesirably contaminated is minimised and as a result good process quality and stability are ensured. Furthermore, bottom-up mechanisms comprising a reservoir with a floor which can be moved like a piston can be cleaned particularly easily if the powder has to be replaced as far as possible without residue e.g. for a change of material. This is associated with greater outlay in the case of other bottom-up mechanisms which convey the powder to the working plane e.g. by means of a screw conveyor.

Moreover, it is known to provide a PBLM system not only with the component reservoir but also with a so-called powder overflow, into which excess powder still located upstream of the slide can be pushed, after the slide has travelled over the component reservoir for the purpose of building-up a new powder layer. For this purpose, the working plane has, in addition to the component reservoir, an aperture which is formed by the opening of a collecting reservoir which forms the powder overflow and adjoins the aperture via the opening below the working plane and into which the excess powder can fall. Such a powder overflow means that the process chamber can be kept as free as possible of excess powder to ensure good process stability.

In order to prevent oxidation-induced contamination of the material during the melting process, PBLM is performed in a protective gas atmosphere. As a result, relative component densities of more than 99% can be achieved by means PBLM. In contrast, the relative density of the powder which is referred to as bulk density is about 50% and thus about half the relative density of the component produced. The relative density thus serves as a measurement of the porosity of the material in its respective current form, i.e. as a finished component or as a powder, in relation to the corresponding material in a pore-free form. Also, the components manufactured by PBLM have mechanical properties which largely correspond to those of the base material or to those of the components which are produced from the base material by means of conventional methods.

For this purpose, PBLM systems have a gas-tight process chamber in which a corresponding protective gas atmosphere, in particular an inert gas atmosphere including argon or nitrogen, is maintained. Typically, at least the working plane and the application medium are arranged directly inside the process chamber. A protective gas atmosphere also prevails in the component reservoir comprising the construction platform and the substrate plate, the powder reservoir of the bottom-up powder conveying mechanism and the powder overflow so that they are connected accordingly in a gas-tight manner to the process chamber for this purpose.

In known PBLM systems, the application medium provided for applying the powder layers is moved as part of a powder application unit during forward travel starting from the powder conveying mechanism a first time to the component reservoir and over same. In this case, powder which is provided by the respective powder conveying mechanism on the working plane and is entrained upstream of the application medium as seen in the direction of forward travel is applied to the construction platform of the component reservoir. The subsequent return travel of the application medium in the opposite direction of travel occurs without the application of a powder layer on the construction platform and thus as empty travel a second time over the component reservoir back to the powder conveying mechanism in order to be supplied with new powder at that location. Excess powder which is still arranged upstream of the application medium after the first travel over the construction platform cannot be entrained during the return travel and is thus still moved further up to powder overflow prior to the return travel and is pushed therein.

Empty travel is avoided in so-called 2-way application. For this purpose, powder application units are used which comprise two mutually spaced-apart application media so that a receiving space for powder is formed between the two application media. Powder can be received and stored in the receiving space and can be output downwards when travelling over the construction platform. As soon as enough powder has been deposited in the receiving space prior to forward travel, the powder can thus be entrained during forward travel and also return travel and in each case a powder layer can be applied onto the construction platform. Such a powder application unit in relation to a laser sintering device is known from US 2008/0203621 A1. The two application media of this powder application unit can each be pivoted away from the working plane about a horizontal axis in order to perform forward travel and return travel with a constant pivot angle. The pivot angle can be adjusted and locked in each case via an adjustment screw.

A powder application unit for a 2-way powder application is known from German utility model document DE 20 2009 016 400 U1, wherein an application medium is provided and is mounted in particular to be movable such that the distance thereof from a working plane can be changed by a purely translational movement.

A powder application unit for a system for laser powder-bed sintering is already known from EP 2 732 889 A2. In this case, the application medium of the powder application unit is pivoted away from the working plane after forward travel, performed in the non-pivoted working position, for the following return travel as empty travel such that it is pivoted with respect to the working position during the return travel. As a result, 2-way powder application is prevented.

US 2012/0164322 A1 also discloses a powder application unit in terms of the preamble of claim 1. The powder application unit comprises two application media in the form of a scraper and in the form of a roller. During forward travel, the scraper is pivoted and also remains in the pivoted position during following return travel as empty travel. By means of the roller, a first powder layer is applied during a first forward travel and the powder layer is compacted during a second forward travel following the return travel. 2-way powder application also does not take place in this case.

U.S. Pat. No. 6,764,636 B1 relates to a stereolithography system comprising an application medium for producing a layer of viscous liquid synthetic material, in particular resin. The application medium is pivoted from a first working position into a second working position after forward travel and the return travel takes place in the second working position different from the first working position.

US 2014/0084517 A1 discloses a comparable stereolithography system in which the application medium is pivoted during forward travel into the first working position in order to use its front edge to scrape off already applied synthetic material, and is pivoted during return travel into the second working position, which is different from the first working position, in order to use its rear edge, opposite the front edge, to apply a layer of viscous liquid synthetic material.

SUMMARY OF THE INVENTION

The invention provides an improved powder application unit for a PBLM system and an improved method which each permit 2-way powder application.

This object is achieved by a powder application unit having the features of claim 1 and a method having the features of claim 9. The dependent claims describe advantageous embodiments of the invention.

In accordance with an aspect of the invention, an improved powder application unit for a PBLM system, wherein the powder application unit comprises an application medium which is mounted to be movable in parallel with a working plane of the PBLM system in order to be able to move powder along the working plane, wherein a distance of the application medium to the working plane can be changed in that the application medium is mounted to be pivotable about a pivot axis in order to be able to pivot the application medium away from the working plane, is achieved by virtue of the fact that the powder application unit comprises a means for pivoting the application medium which is configured and co-operates with the application medium such that the application medium is initially not pivoted in a working position during forward travel so that during forward travel powder arranged upstream of the application medium in the direction of travel can be moved in the direction of travel in order to apply a first powder layer to a construction platform arranged beneath the working plane, is then pivoted with respect to the working position during the continued forward travel along a predetermined path so that excess powder which is arranged upstream of the application medium in the direction of travel after applying the first powder layer can be travelled over, and is not pivoted in the working position during an opposite return travel along the predetermined path so that during the return travel the excess powder arranged upstream of the application medium in a direction of travel opposite the forward travel can be moved in the opposite direction of travel in order to apply a second powder layer to the construction platform.

Such a powder application unit has a simple design because it is not necessary to provide two application media nor a receiving space used as a powder reservoir of the powder application unit. Compared with known powder application units having only one application medium and an empty travel which is required accordingly, the powder application unit in accordance with the invention produces considerably shortened non-productive times and a corresponding increase in productivity. In this case, with respect to the arrangement of the pivot axis, with the exception of an orientation at right angles to the working plane, all orientations of the pivot axis are possible because a corresponding distance of the application medium to the working plane has to be achieved by pivoting for travelling over the powder. Moreover, the powder application unit in accordance with an embodiment the invention may be used in combination with a bottom-up powder conveying mechanism which comprises a reservoir (powder reservoir) which has a floor movable in the manner of a piston. This results in a reduced build-up of dust compared with a top-down powder conveying mechanism and additionally in a reduced cleaning outlay compared with a bottom-up powder conveying mechanism having a screw conveyor.

Provision may be made that the pivot axis is oriented in parallel with the working plane and preferably in parallel with the longitudinal extension of the application medium. A compact structure is hereby possible, in particular when the application medium is elongate owing to a wide construction platform because a small amount of space is accordingly required for pivoting.

The means for pivoting the application medium can be an electrical or optical means e.g. in the form of an electrical contact or a light barrier, via which a drive is actuated during forward travel along the predetermined path, said drive effecting corresponding pivoting.

Provision can alternatively be made that the means for pivoting the application medium comprises a stop which defines the predetermined path in that, during the forward travel along the predetermined path, it is in contact with a component of the powder application unit moved in the direction of travel and hereby pivots the application medium. In order to achieve the 2-way powder application, the stop can be mounted to be movable in order to be moved away from the movement region of the movable components for the return travel, thereby stopping pivoting during the return travel.

Provision may be made that the moved component is formed as an entrainer which is mounted to be movable such that it is moved relative to its movement in the direction of travel owing to the contact with the stop, wherein the entrainer is connected to the application medium such that a movement performed by the entrainer owing to the contact with the stop is transferred to the application medium such that the application medium is pivoted about the pivot axis only during the forward travel. As a result, the stop can be arranged in a positionally fixed manner in the movement region of the powder application unit.

Provision may be further made that the entrainer is mounted to be rotatable about an axis of rotation, wherein the entrainer is connected to the application medium such that a rotational movement performed by the entrainer owing to the contact with the stop is transferred to the application medium such that the application medium is pivoted about the pivot axis only during the forward travel. This permits a particularly simple movement coupling of the entrainer and the application medium.

A further simplified movement coupling may be achieved by virtue of the fact that the axis of rotation is oriented in parallel with the working plane and transversely, in particular at right angles, to the direction of travel and preferably the pivot axis is oriented in parallel with the axis of rotation and in particular the axis of rotation is formed by the pivot axis and the entrainer is pivoted together with the application medium in the first rotational direction.

In accordance with an aspect of the invention, an improved PBLM system suitable for 2-way powder application, having a process chamber which comprises a chamber floor which forms the working plane of the PBLM system, and having a powder application unit which is arranged in the process chamber, is achieved by virtue of the fact that the powder application unit is formed as per any one of the embodiments in accordance with the invention. The above advantages relating to the powder application unit apply mutatis mutandis to a PBLM system equipped therewith.

Provision may be made that the means for pivoting the application medium is arranged on the chamber floor, in particular next to a construction platform of the PBLM system.

In accordance with an aspect of the invention, a method for applying two successive powder layers in a PBLM method is proposed, comprising the steps of:
a) moving an application medium arranged in a working position in a direction of travel in parallel with a working plane during forward travel, wherein during the forward travel powder arranged upstream of the application medium in the direction of travel is moved in the direction of travel in order to apply a first powder layer to a construction platform arranged beneath the working plane,
b) pivoting the application medium from the working position about a pivot axis after applying the first powder layer to the construction platform,
c) travelling over excess powder which is arranged upstream of the application medium in the direction of travel after applying the first powder layer,
d) pivoting the application medium about the pivot axis in a working position after travelling over the excess powder,
e) moving the application medium arranged in the working position in a direction of travel opposite the forward travel in parallel with the working plane during return travel, wherein during the return travel the excess powder arranged upstream of the application medium in the opposite direction of travel is moved in the opposite direction of travel in order to apply a second powder layer to the construction platform.

Such a method has the advantages set forth above in relation to the powder application unit in accordance with the invention.

BRIEF DESCRIPTION OF THE DRAWINGS

An exemplified embodiment of the invention will be explained in greater detail hereinafter with reference to the drawings in which:

FIG. 1 shows a schematic illustration of a PBLM system with the process chamber completely open;

FIG. 1a shows a side view of the PBLM system shown in FIG. 1 with the process chamber completely closed;

FIG. 1b shows a view of an inner side of the cover of the process chamber of the PBLM system shown in FIG. 1;

FIG. 2 shows a view of a powder application unit in its working position with the process chamber completely closed at the beginning of forward travel of the application medium;

FIG. 3 shows a view of the powder application unit of FIG. 2 when travelling over a stop for pivoting the application medium at the end of the forward travel;

FIG. 4 shows a view of the powder application unit of FIG. 2 after travelling over the stop at the beginning of the return travel of the application medium; and FIG. 5 shows a view of the powder application unit of FIG. 2 when travelling over the stop during the return travel.

DETAILED DESCRIPTION OF THE PREFERRED EMBODIMENT

FIG. 1 shows a view of a PBLM system 1 comprising a bottom-up powder conveying mechanism. The PBLM system 1 is designed as a so-called single scanner system and comprises accordingly only one scanner unit 2 with a laser. However, basically the PBLM system 1 is not restricted to lasers because, instead of using a laser it is also possible to use another device which can generate electromagnetic radiation suitable for selectively melting the respective material, e.g. electron beam melting (EBM). Moreover, the PBLM system 1 has a frame-like table 3 which supports a process chamber 4 formed in the manner of a housing. The process chamber 4 has a substantially box-shaped or cuboidal structure with a chamber ceiling 4i formed as a movable cover 4a, a chamber floor 4b and four side walls 4c. Accordingly, the four side walls 4c are each formed in a rectangular shape and are formed by a rear wall 4e, a front wall 4f opposite thereto (see FIGS. 1a and 1b) and two end walls 4g. On its underside, the process chamber 4 is connected to the table 3 via the chamber floor 4b. The cover 4a comprises at least the chamber ceiling 4i and, for the purpose of opening or closing the process chamber 4, can be moved relative to the chamber floor 4b and the table 3 between an open position illustrated in FIG. 1 and a closed position illustrated in FIG. 1a. In the closed position, the cover 4a thus serves to close the process chamber 4 in its upper region or, in the open position, said cover ensures that the process chamber 4 is accessible from above. In this sense, the cover 4a cannot be equated to a possible side door on one of the side walls 4c.

In order to be able to perform the PBLM method, the cover 4a must be in the closed position. Only then is the process chamber 4 closed in a gas-tight manner with respect to its surrounding area so that, as described in the introduction, the protective gas atmosphere which is required to perform the PBLM method can be produced and maintained in the process chamber 4 by means of a protective gas feed, not illustrated.

The PBLM system 1 can be placed on a floor via the table 3. The scanner unit 2 arranged completely, in particular including the optical components for the defined coupling-in of the laser radiation, outside the process chamber 4, can be connected to the table 3 and can be supported thereon and/or can be stood separately on the floor as indicated in FIG. 1. Moreover, the scanner unit 2 can be pivoted above the process chamber 4 and/or next to the process chamber 4 and conversely can be pivoted back over the process chamber 4 for the ongoing operation of the PBLM system 1. The laser beam of the scanner unit 2 which is correspondingly pivoted back and is thus arranged above the process chamber 4 is then coupled into the process chamber 4 via one of two coupling-in glasses 4d (see also FIG. 1b) provided in the cover 4a or the chamber ceiling 4i and is guided to the selected regions in the region of the powder layer to be melted. However, the PBLM system 1 can be designed not only as a single scanner system having a scanner unit 2 but can also be designed as a multiscanner system, in particular as a two-scanner system with two scanner units 2. Accordingly, at least one further laser beam must be coupled into the process chamber via one of the coupling-in glasses 4d, wherein a plurality of laser beams can also be coupled-in through a coupling-in glass 4d.

Arranged within the process chamber 4 is a horizontally extending working plane which is formed substantially by the chamber floor 4b or the surface thereof and is defined in a rectangular shape by the side walls 4c.

Moreover, a powder application unit 8 having an application medium in the form of a brush 8e which is movable in parallel with the working plane via a bar-shaped slide 8a is arranged in the process chamber 4, i.e. in a space enclosed by the closed process chamber 4. The powder application unit 8 is attached to an inner side of the cover 4a (see also FIG. 1b) and consequently, when the process chamber 4 is being opened, can be moved together with the cover 4a between the open position (see FIG. 1) and the closed position (see FIG. 1a). In this case, the powder application unit 8 is arranged in the closed position of the cover 4a and in particular during ongoing operation of the PBLM system 1 such that the slide 8a can be moved in a reciprocating manner above the working plane and in parallel therewith in a direction of travel F (see FIGS. 2 to 5) in order to effect a uniform application of powder on the construction platform and a substrate plate of the PBLM system 1 supported thereby by means of the application medium attached to the slide 8a. The closed position of the cover 4a corresponds to a working position of the powder application unit 8, wherein the powder application unit 8 is suspended from the cover 4a in the direction of the chamber floor 4b. By reason of the attachment of the powder application unit 8 to the cover 4a, no attachment to the chamber floor 4b is provided which means that the chamber floor is free of components of the powder application unit 8. The material, provided in powder form, for producing a component is provided to the application medium for this purpose by a bottom-up powder conveying mechanism, described in greater detail below, in the region of the working plane. Further details relating to the process chamber 4 and the powder application unit 8 are described in greater detail below.

Between its two ends, the working plane is not formed exclusively by the chamber floor 4b because three apertures which, as seen in the direction of travel F, are arranged next to one another and spaced apart from one another are provided in the chamber floor 4b and thus also in the working plane.

One of the two outer apertures is adjoined below the working plane by a releasably attached collecting reservoir 14 serving as a powder overflow for excess powder. The corresponding aperture is defined by an upper opening in the collecting reservoir 14 or a side wall 14a of the collecting reservoir 14, which for its formation extends at least with its inner side downwards at a right angle from the working plane, or by a correspondingly formed intermediate piece which connects the aperture to the collecting reservoir 14 or its upper opening. The collecting reservoir 14 is arranged on one of the opposite ends of the working plane, between which the slide 8a with the application medium moves when the cover 4a is in the closed position. The base surface of the collecting reservoir 14 is substantially trapezoidal. In this case, the correspondingly elongate and narrow base surface extends with its longitudinal extension transversely to the direction of travel F and thus in parallel with the longitudinal extension of the application medium and of the slide 8a.

The other one of the two outer apertures is adjoined below the working plane by a first reservoir 5a and the inner one of the three apertures is adjoined by a second reservoir 5b in the sense described in the introduction. In this case, the two reservoirs 5a, 5b together with their upper openings adjoin the working plane via the respective aperture and thereby define said working plane. Both reservoirs 5a and 5b are constructed in a similar manner and comprise in this case a first or second side wall 6a or 6b whose inner side extends at a right angle to, and away from, the working plane. A first support plate 7a and a second support plate 7b located opposite the corresponding upper opening are each fitted within each side wall 6a, 6b and are arranged to be movable therein in the manner of a piston in order to form the corresponding floor of the reservoir 5a, 5b. The reservoirs 5a, 5b each have a base surface. The respective side wall 6a, 6b and the floor which is formed by the support plate 7a, 7b are formed corresponding to the base surface. In the present case, the side walls 6a, 6b are cylindrical so that the reservoirs 5a, 5b form a type of cylinder-piston unit.

The reservoirs 5a, 5b can have a round base surface, a circular base surface as illustrated in particular in FIG. 1, or even an oval base surface. However, as an alternative it is also feasible to provide reservoirs 5a, 5b having square or rectangular base surfaces or having bases surfaces which have both round and straight side edges. The side walls 6a, 6b and the support plates 7a, 7b are formed corresponding to the base surface and the support plates 7a, 7b are also fitted into the respective side walls 6a, 6b in order to perform their above-described function as a piston. In this case, the support plates 7a, 7b extend with their surface in each case corresponding to the base surface in parallel with the working plane and at a right angle to the side walls 6a, 6b. The base surfaces of the reservoirs 5a, 5b do not have to be identical as in the present exemplified embodiment and instead base surfaces which are not alike and are not the same size are also feasible. However, typically the base surface of each collecting reservoir 14 is smaller than the base surface of the first reservoir 5a operated as the component reservoir.

The support plates 7a, 7b can be lifted and lowered by means of schematically illustrated drives 13, which are designed e.g. as electromechanical lifting cylinders, ball screws, belt drives, pneumatic or hydraulic drives, within the respective reservoir 5a, 5b or the side walls 6a, 5b thereof in a purely translational or linear movement in a direction perpendicular in relation to the working plane, with the required precision to generate the desired layer thickness.

The first support plate 7a serves as a construction platform and is lowered during performance of the PBLM method, as described in the introduction, together with the substrate plate, not illustrated, starting from a starting position, wherein the component to be manufactured and the powder bed are built up on the first support plate 7a or the substrate plate attached thereto and are supported thereby within the reservoir 5a. In order to be able to screw the substrate plate to the support plate 7a, the support plate 7a has corresponding bores. The second reservoir 5b is part of the bottom-up powder conveying mechanism and in this case is also used as a storage reservoir for powder, wherein the second support plate 7b is raised during performance of the PBLM method, as described in the introduction, in the direction of the working plane in order to convey powder to the working plane, said powder being stored below the working plane in the second reservoir 5b. By inversely lowering the second support plate 7b, the volume of the second reservoir 5b is increased in order to be able to receive and store a corresponding quantity of new powder. In this case, the quantity of powder which can be received is limited by the volume of the second reservoir 5b when the support plate 7b is lowered to the maximum extent according to the maximum lifting height. FIG. 1 illustrates the two support plates 7a, 7b in each case in a raised position in the region of the working plane.

In order to load or fill the PBLM system 1 with material in powder form, such a bottom-up powder conveying mechanism or its reservoir can be filled through its upper opening and the associated aperture in the working plane. The process chamber 4 is to be opened for this purpose.

By virtue of the fact that the reservoirs 5a, 5b and the collecting reservoir 14 are connected to the process chamber 4 via the respective aperture in the chamber floor 4b, when the PBLM method is being performed the protective gas atmosphere is also to be maintained at this location and the respective connection is correspondingly gas-tight. The reservoirs 5a, 5b and the collecting reservoir 14 themselves are also gas-tight with respect to their surrounding area.

FIG. 1a shows a side view of the PBLM system 1 shown in FIG. 1 with the process chamber 4 completely closed. Proceeding from FIG. 1, in which the cover 4a is depicted in the open position and points with its inner side obliquely upwards and away from the PBLM system 1 and in particular away from the chamber floor 4b, the cover 4a has been moved together with the powder application unit 8, which is attached to the inner side, to the closed position. In order to be able to move the cover 4a to the closed position shown in FIG. 1 and back to the open position, the cover 4a is mounted so as to be correspondingly movable, in particular in an articulated manner and therefore so as to be pivotable. For this purpose, the PBLM system 1 comprises a pivot mechanism, between whose two pivot arms 10 (see also FIG. 1) the cover 4a and thus also the powder application unit 8 is rotatably mounted. The cover 4a can be pivoted manually or automatically between the open position and the closed position by means of a preferably form-locking traction drive 11, e.g. in the form of a geared belt drive or chain drive, and/or a force device 12, e.g. in the form of a spring element, preferably in the form of a gas compression spring, a hydraulic or pneumatic drive, in particular a lifting cylinder, or a linearly acting electric drive which each act upon the cover 4a and upon a fixed point of the PBLM system 1.

FIG. 1b shows a view of an inner side of the cover 4a of the process chamber 4 of the PBLM system 1. The powder application unit 8 is attached to the chamber ceiling 4i on the illustrated inner side of the cover 4a. Moreover, the entire front wall 4f is attached to the chamber ceiling 4i in order to form the cover 4a and to be movable together between the open position and the closed position. As a result, the front wall 4f is connected to the chamber floor 4b and the remaining adjoining side walls 4c only in the closed position and is spaced apart therefrom in all other positions. Therefore, particularly in the open position the chamber floor 4b is accessible without edges and thus without barriers in the corresponding region at the height of the working plane. This permits particularly easy cleaning of the process chamber 4.

In addition, each end wall 4g is split in two, of which each part is likewise attached as a part of the cover 4a to the chamber ceiling 4i. The parts of the end walls 4g which are complementary thereto and are attached to the chamber floor 4b (see FIG. 1) flatten starting from the rear wall 4e. Both parts form, in the closed position, a complete rectangular end wall 4g (see FIG. 1a). Moreover, at least one viewing window 4h is arranged in one of the side walls 4c, e.g. as shown in FIG. 1b two viewing windows 4h in the front wall 4f, through which in the closed position the process chamber 4 can be viewed.

In order to be able to reliably extract smoke gas which is produced during the PBLM method, contains in particular soot particles of the melted powder and attenuates the laser radiation coupled into the process chamber 4, a smoke gas extraction system split in two is provided. The smoke gas extraction system is part of a filter system for filtering a volume stream which contains the smoke gas of the PBLM system 1 and is guided through the PBLM system 1. Within the process chamber 4, the volume stream is divided into a first volume stream guided along the coupling-in glasses 4d and into a second volume stream guided along the working plane. Both volume streams are, where possible, homogeneous and laminar and mutually parallel at least in the region of the coupling-in glasses 4d or the chamber floor 4b. For this purpose, as seen in the direction of travel F, a strip 9d (see FIG. 1) of the smoke gas extraction system is provided in each case at opposite ends of the process chamber 4 on the chamber floor 4b.

A first part of the smoke gas extraction system which is attached to the cover 4a for the first volume stream comprises for each coupling-in glass 4d a flat and funnel-shaped channel 9 which, starting from a first opening 9a arranged on the corresponding coupling-in glass 4d, extends along the cover 4a in the direction of the end wall 4g. In this case, the opening 9a extends approximately over the width of the coupling-in glass 4d. The channel 9 tapers in the direction of the end wall 4g, then extends in a tubular manner, in particular at a right angle, away from the cover 4a and terminates with a second opening 9b. All of the components of the smoke gas extraction system attached to the cover 4a are arranged outside the movement region of the powder application unit 8, wherein the funnel-shaped region of the channel 9 is arranged between the cover 4a and the components of the powder application unit 8 which are movable in the direction of travel F. The first volume stream extends between the two openings 9a outside the channel 9 and in parallel with the chamber ceiling 4i through the process chamber 4 in order to discharge smoke gas from the region of the coupling-in glasses 4d from the process chamber 4. The smoke gas extraction system in the region of the coupling-in glasses 4d is important in order to prevent said glasses from becoming contaminated by deposits produced by smoke gas and reducing the power of the coupled-in laser beam or to prevent said glasses from being destroyed as a result of increased absorption of the laser radiation at the contaminated site by reason of strong local heating associated therewith.

A second part of the smoke gas extraction system which is provided for the second volume stream is formed by two facing intersections, of which in each case one is formed in one of the two strips 9d. Between the two intersections, the second volume stream is guided in the region of the chamber floor 4b through the process chamber 4 in order also to discharge smoke gas from the region of the working plane from the process chamber 4.

In order to divide the volume stream guided into the process chamber 4 or to combine the two volume streams to form one common volume stream guided through the filter system, each strip 9d has a third opening 9c which, when the cover 4a is closed, coincides with the second opening 9b in the tubular part of the channel 9 (see FIG. 2). The volume stream is caused, by the particular strip 9d, to flow into the process chamber 4 and to be separated, said process chamber being arranged more remotely from the component reservoir. The two volume streams are then combined by the strip 9d arranged more closely to the component reservoir and are guided out of the process chamber 4 in order to be filtered. After filtering, the filtered volume stream is guided via the intersection of the other strip 9d back into the process chamber 4 and is divided up accordingly.

The powder application unit 8 comprises not only the slide 8a for the application medium but also a linear drive unit 8b with a motor. The drive unit 8b is attached preferably completely to the chamber ceiling 4i, optionally also partially to one or a plurality of side walls 4c attached thereto and extends in the form of a rail in the direction of travel F and in this case preferably in parallel with a plane formed by the chamber ceiling 4*i* and preferably also in parallel with the front wall 4*f*. When the cover 4*a* is in the closed position, both the slide 8*a* and also the application medium extend with their longitudinal extension in parallel with the working plane and substantially transversely, in particular at a right angle, to the direction of travel F. By means of a drive block 8*g* which is driven by the drive unit 8*b*, a crossbar 8*d*, on which the slide 8*a* with the application medium is mounted, can be moved translationally in a reciprocating manner in the direction of travel F between opposite ends of the cover 4*a* which are formed by the two end walls 4*g* or the parts thereof connected to the chamber ceiling 4*i*. In this case, the crossbar 8*d* is connected at one of its two ends to the drive block 8*g* and is connected at the opposite other end to two guide carriages 8*c* for the purpose of absorbing transverse forces. The two guide carriages 8*c* are arranged for this purpose at a fixed spaced interval one behind the other in the direction of travel F and can be moved along a guide rail 8*f* which serves as a guide and extends in a straight line in the manner of a linear guide. The guide rail 8*f* is attached to the chamber ceiling 4*i* in a similar manner to the drive unit 8*b* and extends spaced apart from the drive unit 8*b* and in parallel therewith and preferably in parallel with the plane formed by the chamber ceiling 4*i*. As a result, the direction of travel F in each position of the cover 4*a* or the powder application unit 8 is in parallel with the plane formed by the chamber ceiling 4*i* and in parallel with the working plane. At least when the cover 4*a* is in the closed position, the plane formed by the chamber ceiling 4*i* also lies in parallel with the horizontal working plane.

By virtue of this structure or the attachment of the powder application unit 8 above the working plane and in particular to the chamber ceiling 4*i* or the cover 4*a*, the powder application unit 8 is suspended in the working position, i.e. in the closed position of the cover 4*a*, from the chamber ceiling 4*i* or from the cover 4*a* to the working plane.

Arranged between the linear drive unit 8*b* and the guide rail 8*f* are the two coupling-in glasses 4*d*, as a result of which, when the cover 4*a* is closed, in each case at least one laser beam can be coupled-in and guided to the corresponding reservoir 5*a* or 5*b*. It is also possible to view the process chamber 4 and the working plane through the coupling-in glasses 4*d*. However, it is likewise feasible for only one coupling-in glass 4*d*, which is dimensioned correspondingly larger, to be provided in order with the laser beams to reach at least the support plates 7*a*, 7*b* or substrate plates of the two reservoirs 5*a*, 5*b* if the PBLM system 1 is a multiscanner system.

FIG. 2 illustrates a view of the powder application unit 8 in its previously described working position when the process chamber 4 is completely closed at the beginning of the forward travel of the application medium. It is possible to see the drive block 8*b*, via which the crossbar 8*d* is drivingly connected to the drive unit 8*b*. The crossbar 8*d* and the slide 8*a* supported thereby are suspended in the direction of the chamber floor 4*b* and are arranged accordingly between the guide rail 8*f* or the drive unit 8*b* and the chamber floor 4*b*. Therefore, none of the previously mentioned components of the powder application unit 8 is attached to the chamber floor 4*b* or the working plane, but instead is located as far as possible therefrom, so as to minimise contamination by powder in the region of the movable components or guide components, in particular the connection of the guide carriages 8*c* to the guide rail 8*c* and of the drive block 8*g* to the drive unit 8*b*, which connection is concealed in FIG. 2 and is therefore not illustrated.

When the cover 4*a* is in the closed position to allow ongoing operation of the PBLM system 1, the powder application unit 8 is in the working position, wherein at least the application medium extends in parallel with the substrate plate and the working plane, so that on the construction platform of the PBLM system 1 in the direction of travel F powder can be applied uniformly with a surface of the respective powder layer which is as flat as possible and is as parallel as possible with the substrate plate and the working plane. In order to be able to orient the application medium in parallel with the surface of the substrate plate or the working plane or even to be able to easily change same, the slide 8*a* has a clamping holder, to which or by means of which the corresponding application medium can be releasably attached and correspondingly oriented. For this purpose, each coupling-in glass 4*d* is releasably attached and removable so that after its removal from the chamber ceiling 4*i* the powder application unit in the process chamber 4 is accessible for corresponding orientation even when the cover 4*a* is in the closed position. Preferably, the drive unit 8*b* and the guide rail 8*f* also extend in parallel with the working plane. Alternatively the slide 8*a* with the application medium can also be mounted so as to be able to rotate about an axis arranged at a right angle to the working plane and e.g. between the two reservoirs 5*a*, 5*b*, wherein the drive unit 8*b* represents a corresponding rotary drive.

The brush 8*e* which serves as an application medium and is movable via the slide 8*a* or guide carriage 8*c* extends continuously along the longitudinal extension of the slide 8*a* and in the working position between the slide 8*a* and the working plane or the chamber floor 4*b*. Preferably, the brush 8*e* extends in the working position and during performance of the PBLM method to the working plane or to the chamber floor 4*b* and contacts same in order to entrain as completely as possible powder which, as seen in the respective direction of travel F, is located upstream of the slide 8*a* or the brush 8*e*, and at the same time to produce the flattest surface possible of the powder layer at the height of the working plane. An effective length is defined by the associated extension of the brush 8*e* along the longitudinal extension of the slide 8*a*. The application medium can entrain powder and apply it uniformly only in the region of the effective length. The effective length can also be formed by more than one brush 8*e* if these brushes are positioned correspondingly closely next to one another.

When the cover 4*a* is in the closed position, the effective length of the application medium is congruent with or shorter than the corresponding longitudinal extension of the base surface of collecting reservoir 14, so that the excess powder can be pushed as completely as possible into the powder overflow, without collecting on the working plane on the edges of the respective powder overflow. However, in order to be able to produce a uniform powder layer, the slide 8*a*, with its effective length formed by the application medium, completely spans at least in the working position the first reservoir 5*a* for the component, preferably also the second reservoir 5*b* of the bottom-up powder conveying mechanism. As a result, the application medium serves not only to push powder onto the first support plate 7*a* or the substrate plate but also serves as means for smoothing the powder layer produced at the desired layer thickness thereby. In the case of the first powder layer, the desired layer thickness of the powder layer corresponds to the spaced interval between the working plane and the substrate plate and in the case of each further powder layer corresponds to the spaced interval between the working plane and the surface of the preceding powder layer.

Moreover, the application medium extends alone or together with the slide 8a starting from the working plane over an effective height which permits entrainment of a powder quantity which is sufficient for the application of at least one uniform powder layer.

Instead of using a brush 8e, it is also possible to use another application medium, such as e.g. a rubber lip, silicone lip, blade or roller.

At the beginning of the forward travel illustrated in FIG. 2, the application medium—formed as a brush 8e and attached to the slide 8a—of the powder application unit 8 is located in the region of the collecting reservoir 14. Proceeding herefrom, the application medium suspended on the crossbar 8d via the slide 8a is moved together with the slide 8a and the crossbar 8d in the direction of travel F in parallel with the chamber floor 4b or the working plane formed thereby in the direction of the first reservoir 5a operated as a component reservoir (see FIGS. 3 to 5). During the forward travel towards the component reservoir, the slide 8a with the application medium initially travels over the second reservoir 5b operated as a powder reservoir of the bottom-up powder conveying mechanism in order to entrain powder, provided thereby on the working plane, in parallel with the working plane and subsequent thereto to apply a first powder layer on the construction platform of the component reservoir. The powder not illustrated in FIG. 2 is arranged upstream of the slide 8a and the application medium in relation to the direction of forward travel F, in order to be entrained thereby and applied in this direction.

The slide 8a and thus also the application medium attached thereto for conjoint rotation therewith via the clamping holder is mounted on the crossbar 8d so as to be pivotable about a pivot axis S oriented in parallel with the working plane. The pivot axis S also extends in parallel with the longitudinal extension of the slide 8a and the application medium and thus transversely, in particular at right angles, to the direction of travel F. As a result, the slide 8a together with the application medium can be pivoted, starting from the non-pivoted working position shown in FIG. 2, away from the working plane and in the direction of the chamber ceiling 4i. In the working position, the distance between the application medium and the working plane is minimal or the application medium contacts the working plane as described above in relation to the effective length or height. In this case, the working position corresponds to a stable equilibrium position of the slide 8a and of the application medium. The slide 8a is mounted to oscillate with respect to the pivot axis S, i.e. the common centre of mass of the slide 8a and of the application medium is located next to the pivot axis S. However, in the working position, the centre of mass, preferably next to the pivot axis S as seen in the direction of the pivot axis S, can also be arranged vertically below the pivot axis S.

Furthermore, the powder application unit 8 comprises an entrainer 15 which forms a component of the powder application unit 8 which is moveable together with the application medium in parallel with the working plane in the respective direction of travel F. The entrainer 15 is mounted on the crossbar 8d in an oscillating manner so as to be rotatable about an axis of rotation D in a first rotational direction D1 (see FIG. 3) and in an opposite second rotational direction D2 (see FIG. 5). The axis of rotation D is oriented in parallel with the working plane and traverse, in particular at right angles, to the direction of travel F. As a result, a rotational movement of the entrainer 15 in the first rotational direction D1 corresponds to a rolling movement of the entrainer 15 in the direction of forward travel F. Each rotational movement of the entrainer 15 is a relative movement of the entrainer 15 in relation to the direction of travel F. In the present exemplified embodiment, the axis of rotation D is formed by the pivot axis S which means that it coincides therewith. The entrainer 15 is planar and has an elongate shape, in particular a droplet shape having a semi-circular section and a truncated cone-shaped section following therefrom. Other non-rotationally symmetrical shapes are also feasible. In its starting position shown in FIG. 2, which corresponds to a stable equilibrium position, the centre of mass of the entrainer 15 is arranged vertically below the axis of rotation D. The entrainer 15 is in the starting position when the slide 8a and the application medium are in the working position, and vice versa.

The slide 8a and thereabove also the application medium are connected to the entrainer 15 such that each rotational movement, proceeding from the starting position, of the entrainer 15 in the first rotational direction D1, performed in particular during the forward travel (see FIG. 3), is transferred to the slide 8a or the application medium and effects the pivoting thereof about the pivot axis S out of the working position. Moreover, the entrainer 15 for each rotational movement proceeding from the starting position in the second rotational direction D2, performed in particular during the return travel (see FIG. 5), and for an opposite rotational movement in the first rotational direction D1 back into the starting position, is decoupled from the slide 8a or application medium so that said components do not perform a corresponding pivoting movement but remain in the working position shown in FIGS. 2 and 5.

FIG. 3 shows a view of the powder application unit 8 of FIG. 2 when first travelling over a stop 16 for pivoting the application medium at the end of the forward travel. The slide 8a and the application medium have already been pivoted from the working position in the position shown in FIG. 3 after the two components have been moved over the support plate 7a or construction platform of the first reservoir 5a and the first powder layer (not shown) has been applied at that location. Since not all of the powder entrained during forward travel has been applied for applying the first powder layer, enough excess powder for applying a second powder layer is still located upstream of the application medium and the slide 8a in relation to the direction of forward travel F on the working plane. By pivoting the slide 8a with the application medium during the continued forward travel and along a predetermined path, a distance of the slide 8a and the application medium to the working plane is produced, wherein the excess powder in relation to the first powder layer is not further entrained but remains on the working plane so that the slide 8a with the application medium can travel over the excess powder. The slide 8a and the application medium are pivoted to travel over the excess powder in terms of a rolling movement in the direction of forward travel F over the corresponding accumulation of excess powder, wherein the parts thereof arranged beneath the pivot axis S are pivoted, proceeding from the working position, initially in the direction of the collecting reservoir 14 and thus opposite the direction of forward travel F. The rolling movement occurs in particular in the direction of a reversal point of the application medium, at which the forward travel ends and the return travel begins.

The stop 16 is used as a mechanical means for pivoting the application medium and simultaneously defines the predetermined path by its extent in the direction of travel F. For this purpose, the stop 16 is arranged on the chamber floor 4b and extends therefrom along the predetermined path with a convex surface in the direction of the chamber ceiling 4i or the moved components of the powder application unit 8. Moreover, the stop 16 is arranged on the chamber floor 4b in a movement region of the entrainer 15 but outside a movement region of the remaining components of the powder application unit 8 which are moved in the direction of travel F. As a result, only the entrainer 15 strikes the stop 16 in forward travel and also in return travel (see FIG. 5), whilst the remaining moved components, in particular the slide 8a and the application medium, can pass without striking the stop. Owing to the entrainer 15 striking the stop 16 and the contact produced thereby along the predetermined path, the entrainer 15 is moved relative to its movement in the direction of travel F or is rotated about the axis of rotation D in forward travel and return travel. This relative movement has the same movement scope in each opposite direction during forward travel and return travel. However, owing to the above-described freewheel-like coupling of the entrainer 15 with the slide 8a or application medium, only the relative movement of the entrainer 15 produced during forward travel by the contact with the stop 16 is converted into pivoting of the application medium from the working position.

During forward travel, the entrainer 15 is initially rotated, corresponding to the shape of the stop 16 along the predetermined path proceeding from its starting position (see FIG. 2), in the first rotational direction D1 (see FIG. 3) and then in the second rotational direction D2 back to the starting position. The rotational movement back to the starting position occurs whilst contact is still on-going, or at the latest after contact has ended, between the entrainer 15 and the stop 16 as a gravity-driven return to the stable equilibrium corresponding to the starting position. It is also feasible to mount the entrainer 15 so that it is acted upon by a spring, wherein for example a torsion spring is tensioned during the rotational movement D1 and is relaxed in order to effect or support the return to the starting position. During the rotational movement in the first rotational direction D1, the entrainer 15 entrains the slide 8a or the application medium and thus transfers the rotational movement into pivoting thereof with respect to the working position, as illustrated in FIG. 3. In the present exemplified embodiment, the pivoting occurs in the first rotational direction D1. The pivoting can also occur beyond the position illustrated in FIG. 3. A complete rotation about the pivot axis S is also feasible, if a gear mechanism with a corresponding transmission is provided between the entrainer 15 and the slide 8a or application medium. If the slide 8a and the application medium have their centre of mass next to the pivot axis S in the working position, as per the present exemplified embodiment, and not vertically beneath the pivot axis S, a second working position is also feasible which is mirror-symmetrical with respect to the pivot axis S and has a stable equilibrium and in which the slide 8a and the application medium can be pivoted in terms of being folded over. For this purpose, a second application medium would then have to be provided on the slide 8a, which medium is arranged on a side opposite the first application medium. If reverse pivoting—opposite to the pivoting—into the working position occurs instead, this can occur like in the case of the entrainer 15 in a gravity-driven manner as a return to the stable equilibrium or owing to the action of a spring.

FIG. 4 shows a view of the powder application unit 8 of FIG. 2 after first travelling over or passing the stop 16 at the beginning of the return travel of the application medium. The entrainer 15 is thus no longer, or is not yet, in contact with the stop 16 and is thus back in its starting position. The slide 8a and the application medium are back in the working position. The excess powder, not illustrated, has been travelled over and is located upstream of the slide 8a or application medium in the direction of return travel F and can be entrained for the application of the second powder layer.

FIG. 5 shows a view of the powder application unit 8 of FIG. 2 when travelling over the stop 16, for the second time, during the return travel. The relative movement of the entrainer 15 occurring owing to the corresponding contact of the entrainer 15 with the stop 16 during the return travel is not transferred owing to the above-described operative connection between the entrainer 15 and the slide 8a or application medium and therefore the slide 8a and the application medium remain in the non-pivoted working position also along the predetermined path, as illustrated in FIG. 5. In other words, the rotational movement performed by the entrainer 15 owing to the contact with the stop 16 is transferred to the application medium such that the application medium is pivoted about the pivot axis S only during forward travel. Accordingly, the rotational movement of the entrainer 15 in the second rotational direction D2 during return travel, as illustrated in FIG. 5, also does not result in pivoting of the slide 8a or application medium, just like the subsequent rotational movement in the first rotational direction D1 back to the starting position of the entrainer 15. As a result, the excess powder travelled over, and thus left behind, during forward travel substantially in the region of the predetermined path can be entrained during return travel also along the predetermined path for the application of the second powder layer in the direction of return travel F.

During the return travel, the slide 8a and the application medium again move over the construction platform in order to apply the second powder layer at that location. In this case, powder applied to the construction platform or chamber floor 4b in forward travel can also be entrained in addition to the excess powder from the forward travel. This powder can contain splashes of melted powder and are pushed over the powder reservoir into the powder overflow, thus not contaminating the powder of the powder reservoir where possible. The return travel ends in this case in the position illustrated in FIG. 2, from where further forward travel can begin.

As a deviation from the present exemplified embodiment, the axis of rotation D and the pivot axis S can also in extend in parallel with, and spaced apart from, each other. It is likewise possible for the pivot axis S to be oriented not in parallel with the axis of rotation D, e.g. in parallel with the direction of travel F. In these cases, the entrainer 15 is to be connected to the slide 8a or application medium in the manner of a gear mechanism in order to convert a rotational movement of the entrainer 15 into a pivoting movement during forward travel.

As indicated in the exemplified embodiment in FIGS. 3 to 5, two entrainers 15 and two stops 16 can also be provided which are arranged at a corresponding distance to each other at opposite ends of the slide 8a or application medium in order to each cooperate as described to pivot the slide 8a or application medium.

LIST OF REFERENCE SIGNS

1 PBLM system
2 Scanner unit
3 Table
4 Process chamber
4a Cover
4b Chamber floor 4c Side wall
4d Coupling-in glass
4e Rear wall
4f Front wall
4g End wall
4h Viewing window
4i Chamber ceiling
5a First reservoir
5b Second reservoir
6a First side wall
6b Second side wall
7a First support plate
7b Second support plate
8 Powder application unit
8a Slide
8b Drive unit
8c Guide carriage
8d Crossbar
8e Brush
8f Guide rail
8g Drive block
9 Channel
9a First opening
9b Second opening
9c Third opening
9d Strip
10 Pivot arm
11 Traction drive
12 Force device
13 Drive
14 Collecting reservoir
14a Side wall
15 Entrainer
16 Stop
D D Axis of rotation
D1 First rotational direction
D2 Second rotational direction
F Direction of travel
S Pivot axis

The invention claimed is:

1. A powder application unit for a PBLM system, wherein the powder application unit comprises:
 an application medium that is mounted to be movable in parallel with a working plane of the PBLM system in order to move powder along the working plane, wherein the application medium is pivotable about a pivot axis to pivot the application medium away from the working plane and raise the application medium a distance above the working plane when traveling along the working plane;
 wherein the application medium is configured to move in a predetermined path along a length of the working plane in a not pivoted working position and a pivoted nonworking position and is pivoted between the not pivoted working position and the pivoted nonworking position via a pivot;
 wherein the application medium is initially disposed in the not pivoted working position during forward travel such that powder arranged upstream of the application medium in the direction of travel can be moved in the direction of travel in order to apply a first powder layer to a construction platform arranged beneath the working plane; and
 wherein the application medium is pivoted into the pivoted nonworking position via the pivot upon traveling over the construction platform such that during continued forward travel along the predetermined path excess powder arranged upstream of the application medium in the direction of travel after applying the first powder layer can be travelled over; and
 wherein the application medium is returned to the not pivoted working position during an opposite return travel along the predetermined path over the construction platform such that during the return travel the excess powder arranged upstream of the application medium in a direction of travel opposite the forward travel can be moved in the opposite direction of travel in order to apply a second powder layer to the construction platform.

2. The powder application unit as claimed in claim 1, wherein the pivot axis is oriented in parallel with the working plane.

3. The powder application unit as claimed in claim 2, wherein the pivot comprises a stop, and wherein during the forward travel of the application medium along the predetermined path a component of the powder application unit is moved into contact with the stop such that the stop pivots the application medium.

4. The powder application unit as claimed in claim 3, wherein the moved component comprises an entrainer, and wherein the entrainer is connected to the application medium such that movement of the entrainer imparted by contact with the stop is transferred to the application medium such that the application medium is pivoted about the pivot axis only during the forward travel.

5. The powder application unit as claimed in claim 4, wherein the entrainer is mounted to be rotatable about an axis of rotation, wherein the entrainer is connected to the application medium such that a rotational movement of the entrainer imparted by contact with the stop is transferred to the application medium such that the application medium is pivoted about the pivot axis only during the forward travel.

6. The powder application unit as claimed in claim 5, wherein the axis of rotation is oriented in parallel with the working plane and transversely to the direction of travel.

7. The powder application unit as claimed in claim 6 wherein the axis of rotation is oriented at a right angle to the direction of travel.

8. The powder application unit as claimed in claim 6, wherein the pivot axis is oriented in parallel with the axis of rotation and the axis of rotation is formed by the pivot axis and the entrainer is pivoted together with the application medium in a first rotational direction.

9. The powder application unit as claimed in claim 2 wherein the pivot axis is parallel with a longitudinal extension of the application medium.

10. The powder application unit as claimed in claim 1 wherein the pivot comprises a stop, and wherein during the forward travel of the application medium along the predetermined path a component of the powder application unit is moved into contact with the stop such that the stop pivots the application medium.

11. The powder application unit as claimed in claim 10, wherein the moved component comprises an entrainer, and wherein the entrainer is connected to the application medium such that movement of the entrainer imparted by contact with the stop is transferred to the application medium such that the application medium is pivoted about the pivot axis only during the forward travel.

12. The powder application unit as claimed in claim 11, wherein the entrainer is mounted to be rotatable about an axis of rotation, wherein the entrainer is connected to the application medium such that a rotational movement of the entrainer imparted by contact with the stop is transferred to the application medium such that the application medium is pivoted about the pivot axis only during the forward travel.

13. The powder application unit as claimed in claim 12, wherein the axis of rotation is oriented in parallel with the working plane and transversely to the direction of travel.

14. The powder application unit as claimed in claim 13, wherein the axis of rotation is oriented at a right angle to the direction of travel.

15. The powder application unit as claimed in claim 13, wherein the pivot axis is oriented in parallel with the axis of rotation and the axis of rotation is formed by the pivot axis and the entrainer is pivoted together with the application medium in a first rotational direction.

16. The powder application unit as claimed in claim 1 in combination with a PBLM system having a process chamber which comprises a chamber floor which forms the working plane of the PBLM system, wherein the powder application unit which is arranged in the process chamber.

17. The powder application unit as claimed in claim 16, wherein the pivot is arranged on the chamber floor.

18. Method for applying two successive powder layers in a PBLM system, comprising:
  a) moving an application medium arranged in a not pivoted working position in a direction of travel in parallel with a working plane during forward travel, wherein during the forward travel powder arranged upstream of the application medium in the direction of travel is moved in the direction of travel in order to apply a first powder layer to a construction platform arranged beneath the working plane;
  b) pivoting the application medium from the not pivoted working position into a pivoted nonworking position via a pivot about a pivot axis after applying the first powder layer to the construction platform;
  c) moving the application medium in the pivoted not working position over excess powder which is arranged upstream of the application medium in the direction of travel after applying the first powder layer;
  d) pivoting the application medium from the pivoted not working position about the pivot axis back to the not pivoted working position after travelling over the excess powder; and
  e) moving the application medium arranged in the not pivoted working position in a direction of travel opposite the forward travel in parallel with the working plane during return travel, wherein during the return travel the excess powder arranged upstream of the application medium in the opposite direction of travel is moved in the opposite direction of travel in order to apply a second powder layer to the construction platform.

* * * * *